United States Patent [19]
Hodges

[11] Patent Number: 5,599,031
[45] Date of Patent: Feb. 4, 1997

[54] WORK DOLLY HAVING ADJUSTABLE HEIGHT, WIDTH AND LENGTH

[76] Inventor: Douglas Hodges, 672 W. 12th St., San Pedro, Calif. 90731

[21] Appl. No.: 392,197

[22] Filed: Feb. 22, 1995

[51] Int. Cl.⁶ .................... B62B 1/00; B62B 5/00
[52] U.S. Cl. .............. 280/79.11; 280/29.3; 280/35; 280/639
[58] Field of Search ............... 280/79.11, 79.3, 280/35, 639

[56] References Cited

U.S. PATENT DOCUMENTS

| | | | |
|---|---|---|---|
| 543,498 | 7/1895 | Monbeck | 280/79.11 |
| 696,535 | 4/1902 | Bailey | 280/79.11 |
| 968,315 | 8/1910 | Beckert | 280/79.11 |
| 1,189,053 | 6/1916 | Buchanan | 280/79.11 |
| 1,300,533 | 4/1919 | Wessinger | 280/79.11 |
| 2,763,491 | 9/1956 | Thorwardson | 280/79.11 |
| 4,166,638 | 9/1979 | De Prado | 280/79.11 |
| 4,934,720 | 6/1990 | Dobron | 280/79.11 |
| 4,984,814 | 1/1991 | Graffunder | 280/79.3 |
| 5,299,817 | 4/1994 | Chang | 280/35 |

*Primary Examiner*—Kenneth R. Rice
*Attorney, Agent, or Firm*—Roger A. Marrs

[57] ABSTRACT

A dolly for movably supporting a load having an adjustable frame with side members and end members. Each side member and end member consists of slidable sections in telescoping relationship for adjusting the length and width of the frame. An adjustable leg is carried on each corner of the frame where adjacent ends of the side members and end members are joined and a load-bearing pad is carried on the end of each leg. Each leg is insertably disposed in the fixture which has a hold-down or tie-down opening provided therein. A wheeled support is carried on the underside of the frame for transport purposes.

1 Claim, 2 Drawing Sheets

WORK DOLLY HAVING ADJUSTABLE HEIGHT, WIDTH AND LENGTH

BACKGROUND OF THE INVENTION

1. Field of the Invention

The present invention relates to the field of equipment supported dollies or carriers, and more particularly to a novel work dolly having means for adjusting width and length as well as height, and which has the ability of distributing applied lots through supporting structure and wheeled support into the ground.

2. Brief Description of the Prior Art

In the past, many dollies have been provided which were wheeled and which supported a substantial load, such as an engine, transmission, or even a complete vehicle. Difficulties and problems have been encountered with such prior equipment mobile support devices as dollies which stem largely from the fact that loads are unevenly carried and distributed so that undue strain and stress is placed on the dolly members and construction. Also, since such dollies are not generally adjustable to all dimensions, including width, length and height, the loads applied again are not evenly distributed throughout the dolly.

Therefore, a long-standing need has existed to provide a novel mobile equipment or workpiece carrying dolly which is adjustable for width, height and length whereby the bed of the dolly conforms to the dimensional outline of the load to be carried so that applied loads are evenly distributed throughout the construction of the dolly.

SUMMARY OF THE INVENTION

Accordingly, the above problems and difficulties are avoided by the present invention which provides a novel work dolly for supporting loads of substantial weight and of varying configuration, which includes a substantially rectangular frame in plan view comprising adjustable end pieces and adjustable side pieces connected together at their opposite ends. Also, wheeled support is provided at each juncture of the end members and the side members so that a wheeled construction is provided. Also, adjustable legs are provided at each juncture of the end members and side members so that height may be adjusted to accommodate a variety of configured loads. Detachable fastening means are used to place the adjusted end members and side members in a selected location as well as the legs in a selected height position. The end members and side members are composed of apertured members of square cross-section and are arranged in telescoping relationship between inserted sections so that adjustment can be provided.

Therefore, it is among the primary objects of the present invention to provide a novel wheeled dolly capable of adjustment in length, width and height so as to accommodate a variety of different shaped and weighted articles, such as engines, transmissions and vehicles.

Another object of the present invention is to provide a novel wheeled dolly which includes a means for adjusting height, having support pads carried thereon for selectively engaging location points on a particular load.

Yet another object of the present invention is to provide a novel work dolly having end members and side members which are adjustable to increase or decrease the width and length of the dolly, and which further includes means for raising and lowering height supports so that a variety of weighted articles can be carried thereon and transported from place to place without toppling, swaying or falling from its supported position.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
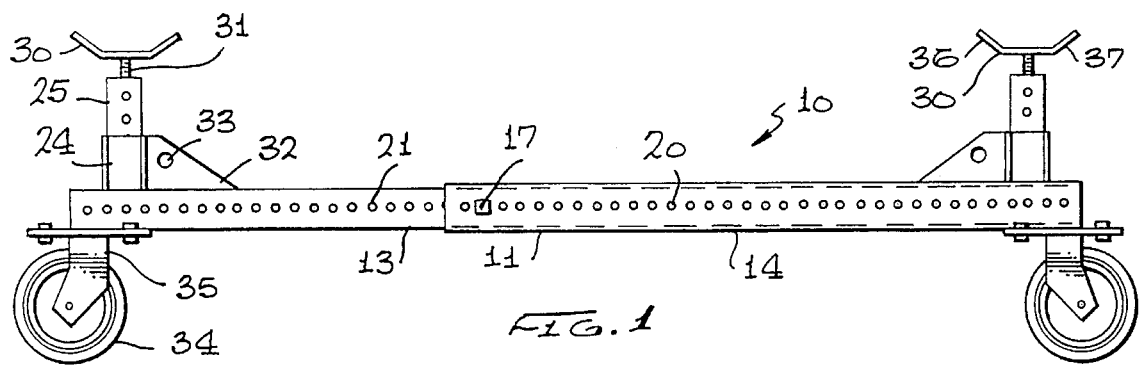
FIG. 1 is a side elevational view of the workpiece dolly incorporating the present invention.
Figure 2:
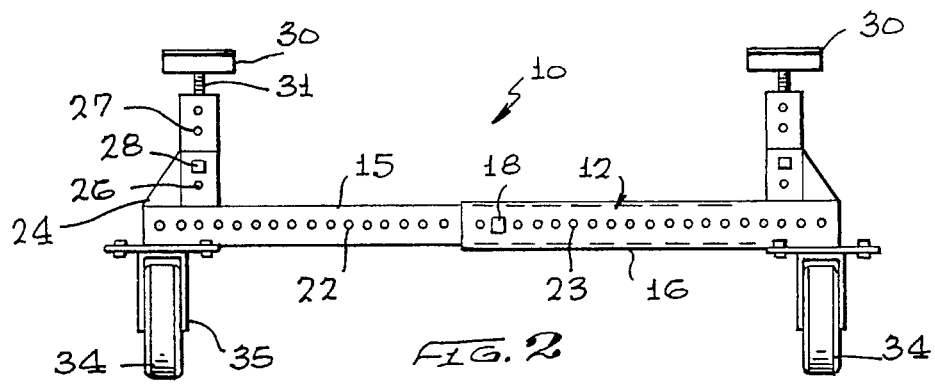
FIG. 2 is an end elevational view of the dolly shown in FIG. 1.

Referring to FIGS. 1 and 2, the novel work dolly of the present invention is illustrated in the direction of arrow 10 which includes a pair of side members 11 and end members 12 which are both readily adjustable for length. This adjustment is provided by constructing each member of telescoping sections 13 and 14 with respect to side member 11 and sections 15 and 16 of end member 12 which are arranged to telescope. Sections 13 and 15 are of smaller diameter or cross-section than the cross-section of 14 and 16 so that the sections will slide together in telescoping relationship when the smaller section is inserted into the bore of the larger section. Once the length and width have been established, releasable fasteners, such as pin 17 with respect to side member 11 and pin 18 with respect to end member 12, may be inserted through aligned openings or apertures in the overlapping sections of the sections 13 and 14 and with respect to sections 15 and 16. As indicated by numerals 20, 21, 22 and 23, the side members and end members are provided with a plurality of openings which, when aligned, will accept the insertion of a pin or a nut and bolt fastener.

With respect to height adjustment, a fixture 24 is provided on each corner of the dolly which includes a receptacle for insertably receiving a leg 25. Both the fixture 24 and leg 25 include openings or apertures such as indicated by numerals 26 and 27 which may be aligned for receiption of a releasable fastener 28 so that the leg will be fixed at a selective and desired height. The terminating end of each leg 25 includes a pad 30 carried on the end of a screw shank 31 whereby additional height can be adjusted by turning the pad so that the threadable engagement with the end of the leg between the shank and the leg will cause the pad to raise or lower.

Each fixture 24 includes a flange 32 having an opening 33 through which hooks, ropes or other holddown devices may be accommodated.

It is also to be noted from the FIGURES that the underside of the frame includes wheels, such as wheel 34, connected to an underside of the frame at each corner on the opposite thereof from the fixture 24 by means of a flanged yoke 35. The wheel 34 is pivotally carried between the legs of the yoke so that the work dolly can be movably transported from place to place carrying its intended load without falling, toppling or shifting. The angling of each pad 30 so as to include upwardly angled ends, as indicated by numerals 36 and 37, serve to further support and assist in load distribution of any cargo or article carried by the dolly.

Figure 3:
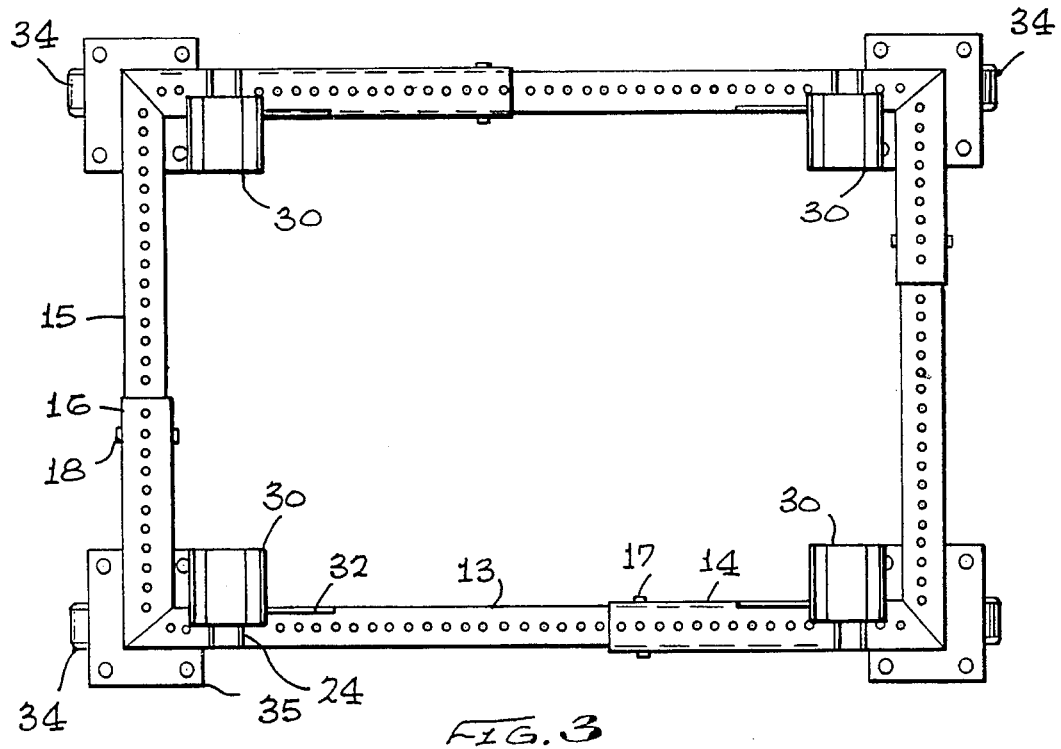
FIG. 3 is a top plan view of the dolly shown in FIGS. 1 and 2.
Figure 4:
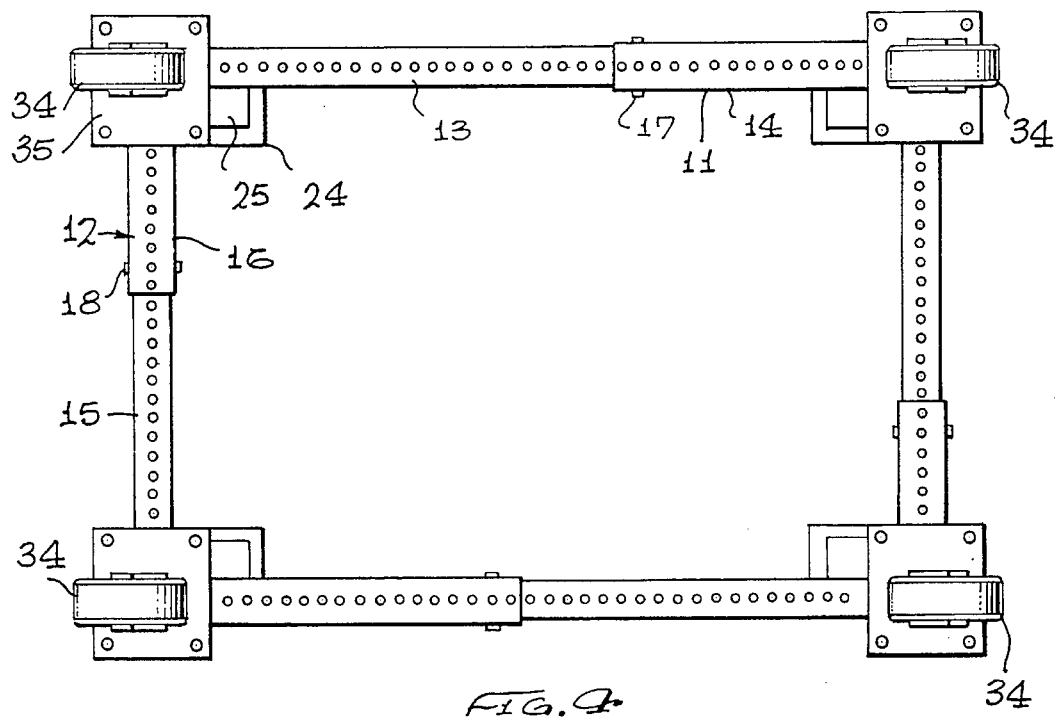
FIG. 4 is a bottom view of the dolly shown in FIGS. 1, 2 and 3.

Referring to FIGS. 3 and 4, it can be seen that the wheeled support is provided at each corner of the frame composed of the end members and side members respectively. The flange 35 of the wheeled support is securely attached to the underside of the frame corner while the flanged receptacle for the foot 25 is on the upper or opposite side of the corner from the wheeled support.

Figure 5:
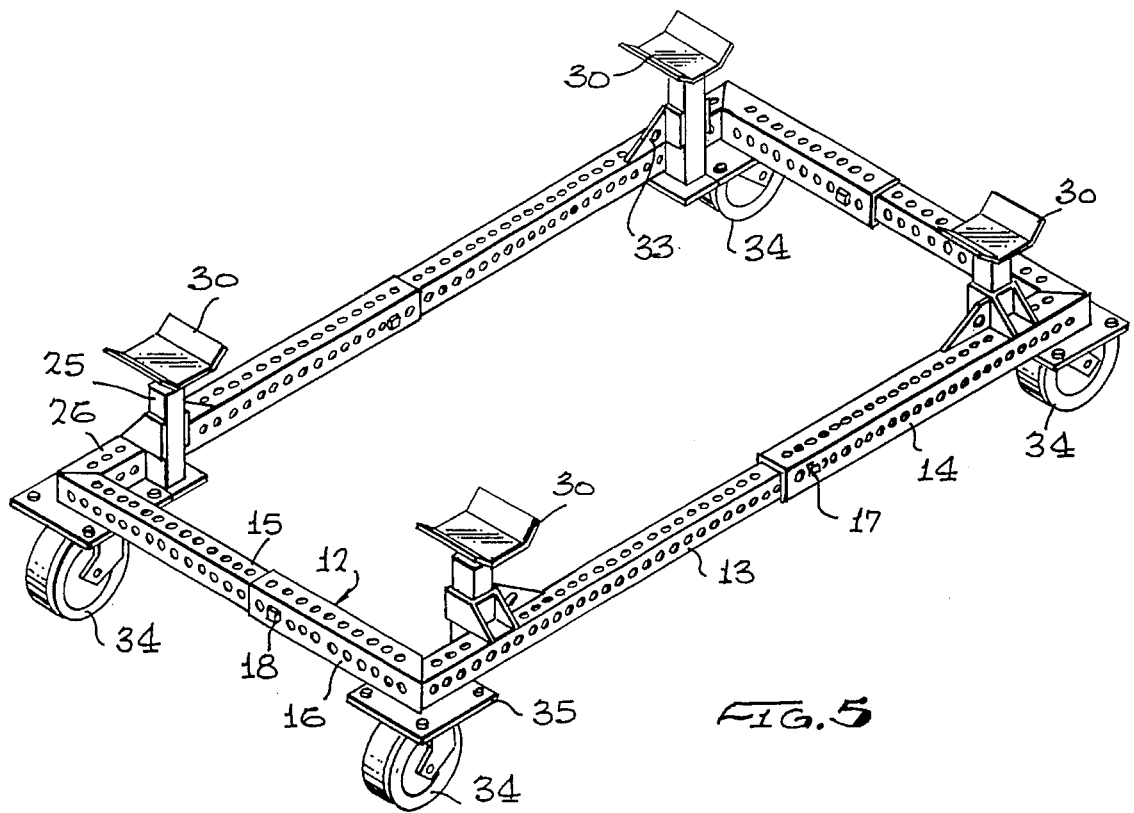
FIG. 5 is a front perspective view of the workpiece dolly shown in the aforementioned FIGURES.

Referring to FIG. 5, the work dolly is illustrated wherein it can be seen that the wheeled arrangement is at each corner and that a leg carrying a support pad is at each corner. Loads carried by the dolly entering through the pads and leg are distributed through the end and side members to the respective wheeled supports and then into the ground. It can also be seen that the length of the dolly can be adjusted by pulling the respective member sections outwardly to provide for a greater length for further inserting the sections together to shorten the length. The same procedure can be done for widening the dolly and by sliding the sections 16 and 17 of end members 12 with respect to one another.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A work dolly comprising:

a rectangular frame having a top side and an underside;

said frame having adjustable side members in spaced-apart parallel relationship and having adjustable end members in spaced-apart parallel relationship;

said side members and said end members having opposite ends whereby adjacent ends of said respective side members and end members are secured together constituting a corner;

each of said end members and said side members consisting of a pair of sections arranged in slidable telescoping relationship whereby the length and width of said frame is adjustable;

fastener means releasably securing said side member sections together to establish a desired frame length and securing said end member sections together to establish a desired frame width;

wheeled means carried at each corner of said frame on said frame underside;

adjustable height means having a fixture secured at each of said frame corners on said frame top side;

said fixture having a receptacle therein;

a leg insertably carried in each of said fixture receptacles;

additional fastener means releasably securing said leg at a desired height from said frame top side;

a load-bearing support pad movably carried on each of said legs to provide additional height adjustment;

said fastener means includes a plurality of apertures arranged in fixed spaced-apart relationship along each side member section and each end member section whereby selected ones of said apertures in registry and in alignment define an open-ended passageway;

said fastener means further includes a fastener insertable into said open-ended passageway to retain said sections in position; and each of said fixtures includes a reinforcement flange secured to an adjacent one of said side members with an opening providing a securement for hold-down devices.

* * * * *